July 1, 1952 — R. S. BOUTELLE — 2,601,963
JET AUGMENTATION ARRANGEMENT
Filed April 9, 1946
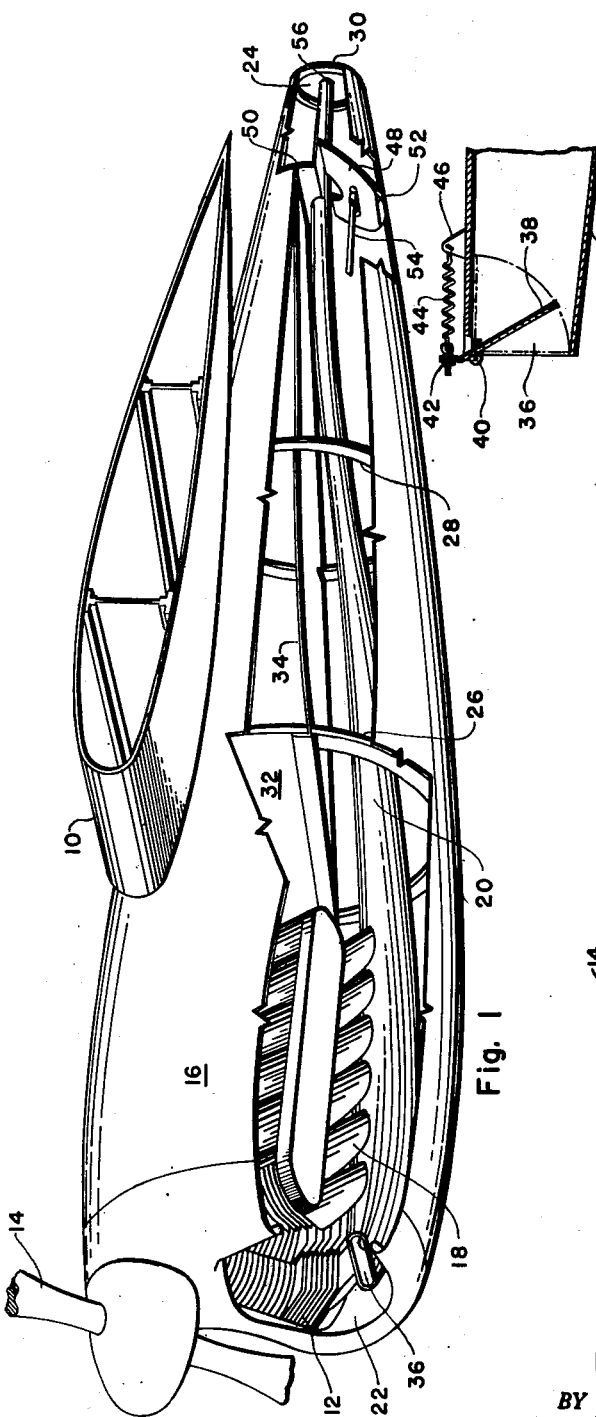
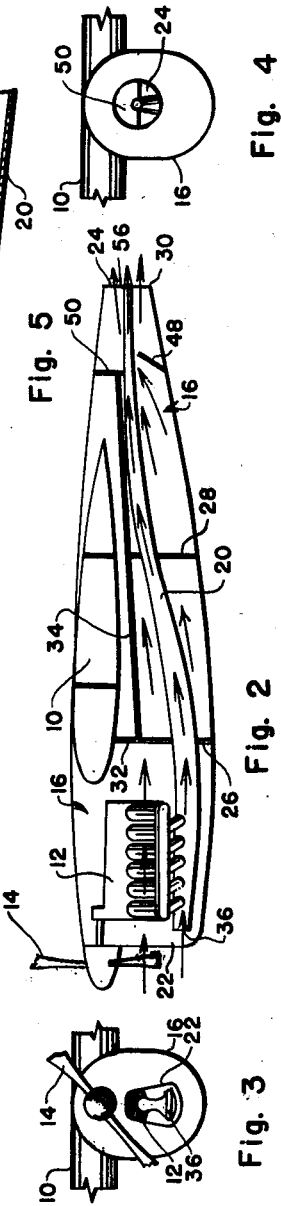
INVENTOR.
Richard S. Boutelle
BY
HIS PATENT ATTORNEY Patented July 1, 1952

2,601,963

UNITED STATES PATENT OFFICE 2,601,963

JET AUGMENTATION ARRANGEMENT

Richard S. Boutelle, Hagerstown, Md., assignor to Fairchild Engine and Airplane Corporation, a corporation of Maryland Application April 9, 1946, Serial No. 660,659

13 Claims. (Cl. 244—53)

The present invention relates to power plants and more particularly to improved cooling and cowling means adapted for augmentation of the jet thrust developed by aircraft power plants.

This invention is directed toward increasing the jet effect or thrust of the exhaust of an engine and augmenting the same by its cooperative action with the engine cooling air. The invention consists essentially of an arrangement in which the energy and velocity of the exhaust gases are utilized as they come directly from the engine, or as they may be increased by rammed air admitted to the exhaust stacks or manifold. The improved arrangement contemplates a parallel or co-axial travel of the cooling air about the hot exhaust gas duct in such a manner that the cooling air rammed within the engine cowling is heated both by the engine and by its passage along the exhaust duct to increase its pressure at the point of discharge. The invention also is directed to the improved thrust effect resulting from the force imparted by the exhaust nozzle upon the larger mass of slower moving engine cooling air, as well as to improved engine cooling conditions and the cooling of the exhaust gases tending to improve flame dampening.

It is accordingly a major object of this invention to augment the thrust of the power plant and propeller installation by utilization of the engine exhaust and the engine cooling air. A further object resides in an increased jet effect obtained by imparting thrust to a larger volume of slower moving engine cooling air. It is a corollary purpose to provide for heating of the engine cooling air by the exhaust gases to increase pressure of this cooling air at its discharge point.

A further objective of this invention is to provide improved flame dampening and silencing by long travel of the exhaust gases, their cooling by the engine cooling air passing around the exhaust gas duct as well as by the admixture of rammed air therewith. It is also a purpose of the invention to increase the circulation and volume of engine cooling air by the suction effect of the jet exhaust to thereby improve the cooling of the engine. A further object resides in the provision of an installation in which internal regulation of the volume of the engine cooling air is facilitated and the aerodynamic characteristics of the installation thereby improved.

Other advantages and objects of the present invention will occur to those skilled in the art after an understanding of the present invention as hereinafter described and shown in the accompanying drawings forming a part hereof, in which:

Fig. 1 is a perspective view of an aircraft power plant and propeller installation as supported from a wing and embodying a preferred form of this invention;

Fig. 2 is a diagrammatic side elevational section of the power plant installation of Fig. 1;

Fig. 3 is a front view of the installation shown in Fig. 2;

Fig. 4 is a rear view of the same; and

Fig. 5 is a detailed cross-section of an inlet to the exhaust duct.

Referring now to Figs. 1 and 2, there is indicated an aircraft wing 10 from which is suitably supported an air-cooled engine 12 driving a tractor propeller 14 enclosed within a streamlined nacelle 16. It will be understood that in the case of single engined aircraft, the nacelle 16 may be a central fuselage. The engine, which has been selected for explanatory purposes only, is of the air-cooled in-line type having its cylinders arranged in the form of an inverted V, but it will of course be understood that the present invention is equally applicable to engines of other types. The engine 12 is provided with a plurality of exhaust stacks or tail pipes 18 by which the exhaust gases from each engine cylinder communicate with the main rearwardly extending exhaust duct 20.

The nacelle or cowl 16 is preferably oval-shaped in cross-section extending in a streamline form from a point well forward of the wing leading edge rearwardly beyond the trailing edge of the wing beyond which it preferably terminates with a circular cross-section. The nacelle body 16 is provided at its forward portion with an inlet mouth 22 into which cooling air is rammed by the forward movement of the aircraft, and the nacelle terminates in a circular exit opening 24 at its trailing portion. The nacelle 16 is provided with a series of former rings 26, 28 and 30 upon the forward one of which is mounted the engine fire-wall 32. The interior of the nacelle from the fire-wall 32 rearwardly is divided by a substantially horizontal partitioning plate 34 which extends across the width of the nacelle at or slightly above its mid-portion, sloping slightly upwardly to a point between the trailing edge of the wing and the nacelle exit 24.

The exhaust duct 20, in the preferred modification shown in the drawings, is provided with a rammed air inlet 36 facing into the nacelle inlet 22 and preferably provided with a spring check valve 38 as more particularly shown in Fig. 5. This check valve is preferably pivotally mounted at 40, having an upwardly extending lever portion 42 to which an adjustable tension spring 44 is attached and connected to a lug 46 on the top of the exhaust duct. The spring check valve is arranged in such manner that while the aircraft is at rest upon the ground, or being moved about at speeds below a predetermined magnitude, the rammed air forces acting upon the valve plate 38 are insufficient to overcome the tension of the spring 44 and under these conditions the valve remains closed in its lower dotted position causing the exhaust gases to be discharged rearwardly within the duct 20 without dilution by rammed air. When the speed of the aircraft is increased above this predetermined level, as in flight, the rammed air forces acting upon the valve plate 38 are sufficient to overcome the tension of the spring 44 and the valve is opened to its upper dotted position permitting cooling air to enter the exhaust duct 20.

A regulating valve 48 is preferably located within the nacelle aft of the wing trailing edge and forward of the nacelle exit 24 in the region of the trailing portion of the partition plate 34 which terminates in a vertical partition plate 50. The regulating valve 48 is preferably hinged at 52 and has pivotally connected to it an operating push-pull rod 54, the entire regulating valve and actuating mechanism being enclosed within the nacelle body and other portions of the aircraft in communication with the pilot cockpit, or a suitable automatic control. The regulating baffle 48 may be notched to fit around the exhaust duct 20 but need not fit tightly against the inner walls of the nacelle as a small air passage therethrough is desirable at all times. The exhaust duct 20 is preferably increased in cross-section at the point at which the engine exhaust gases 18 open into it but rearwardly of the engine it is preferably reduced gradually in cross-section and bent upwardly to have its horizontal trailing portion discharge through an opening or nozzle 56 centrally or co-axially with the nacelle air exit 24. It is also preferable that the duct 20 extend centrally and co-axially with the nacelle for a substantial distance as shown in Fig. 2.

The operation of the present jet augmented power plant in flight is substantially as follows: Assuming that the aircraft is flown at a speed in excess of that at which the check valve is adjusted to operate, rammed air is taken into the inlet 22 of the nacelle 16, a portion of the air passing over the cooling fins of the cylinders of the engine 12 and a portion entering the inlet opening 36 of the exhaust duct 20 past the open valve 38. As indicated by the arrows in Fig. 2, the cooling air passing over the engine cylinders and rearwardly within the nacelle 16, as well as about the exhaust duct 20, is heated by the engine exhaust gases and thus has its pressure increased as it approaches the point of discharge at 24. The flow of engine cooling air may be suitably controlled, as indicated above by the internal regulator plate 48 and its actuating mechanism 54.

The rammed air which enters the inlet 36 of the duct 20 becomes thoroughly mixed with the exhaust gases entering the duct from the exhaust stacks 18, causing a secondary or more complete combustion of the unburned fuel in the exhaust to thereby increase the exhaust gas pressures at the outlet 56 of the exhaust duct 20. This jet thrust of the exhaust is increased by the discharge of the larger mass of slower moving engine cooling air passing out through the annular exit space 24 around the nozzle 56, through which the exhaust gases are discharged, thus creating an augmenting effect by imparting the thrust force of the exhaust gas to a larger volume of slower moving air. This supplementary column of rammed air which is heated by both the engine and the exhaust duct is thus appreciably increased in pressure at the point of discharge to add to the thrust effect imparted to it by the exhaust gas nozzle. As a result of the long travel of the exhaust gases within the duct 20, as well as by the cooling effect of the engine cooling air passing rearwardly through the nacelle and around the exhaust duct, the present arrangement provides a greatly improved flame dampening as well as a silencing device.

The present arrangement also accomplishes an improved cooling of the engine in view of the increased circulation and volume of the engine cooling air as a result of the suction created by imparting some of the force of the exhaust gases to this cooling air column. In other words the jet thrust imparted by the exhaust nozzle 56 to the mass of cooling air passing through the annular exit 24, in addition to the beneficial thrust obtained, also serves as an eductor device inducing a greater volume of cooling air to enter the nacelle mouth 22 and flow over the cylinders of the engine. It will also be noted that among the further improved results obtained by the present jet arrangement, the overall aerodynamic resistance of the power plant installation is materially reduced by virtue of the internal regulation of the cooling air volume as compared with prior arrangements which have been externally exposed to the surrounding air stream. A modification of the present arrangement contemplates the omission of the inlet opening at 36 in the exhaust duct and the check valve 36 and in certain installations it may be desirable to insulate the nacelle interior.

Other forms and modifications of the present invention, both with respect to its general arrangement and the details of its respective parts, which will become obvious to those skilled in the art after an understanding of this invention, are intended to fall within the scope and spirit thereof as more particularly set forth in the appended claims.

I claim:

1. An exhaust thrust augmenter for an aircraft power plant comprising an air-cooled engine, a streamlined nacelle enclosing said engine having a cooling air inlet opening at its forward portion and an air outlet opening at its trailing portion arranged to direct cooling air flow from said inlet to said engine, rearward through said nacelle and out through said outlet opening, an exhaust duct in communication with the exhaust gases from said engine having a gradually diminishing cross-section terminating in a nozzle common with the said air cooling outlet of said nacelle, said exhaust duct having an inlet opening common to the cooling air inlet opening of said nacelle arranged such that cooling air is admixed with said exhaust gases from said engine to improve the combustion thereof, valve means disposed in the said duct inlet opening arranged to close the said exhaust duct inlet at predetermined lower speeds of the aircraft, and a controllable valve for regulating the volume of engine cooling air through said nacelle outlet.

2. An aircraft power plant installation comprising an air-cooled engine, an elongated nacelle enclosing said engine, said nacelle having a rammed air inlet at its forward portion for engine cooling air and an engine cooling air outlet at its trailing portion, and a single continuous duct in communication with the exhaust of said engine disposed within said nacelle having its forward end open at a point forward of said engine to receive a portion of the rammed air flowing into the said nacelle air inlet, said duct having a gradually diminishing cross-section terminating in an outlet centrally disposed in the nacelle cooling air outlet at the same transverse plane thereof arranged to impart augmented velocity to said cooling air and increased thrust to said power plant installation.

3. An exhaust thrust augmenter for an aircraft power plant installation comprising an air-cooled engine, an elongated nacelle enclosing said engine having a forward cooling air inlet opening and a rearward cooling air outlet opening, said nacelle being elongated such that its length is greater than three times its greatest transverse dimension, an exhaust duct in communication with said engine exhaust co-extensively disposed within said elongated nacelle, said exhaust duct having a cooling air inlet within said nacelle inlet forward of said engine, said exhaust duct having an exhaust nozzle centrally discharging to the atmosphere at the said nacelle outlet opening, said exhaust duct having a gradually diminishing cross-section as it extends rearwardly to its smallest diameter at said exhaust nozzle, the interior of said nacelle arranged to cause cooling air admitted to said nacelle air inlet to flow over the cylinders of said engine and rearwardly about the said exhaust duct and nozzle to create an augmenting effect by imparting the thrust force of the exhaust in said exhaust duct to the larger volume of slower moving surrounding engine cooling air passing rearwardly through said nacelle outlet, and valve means disposed within said nacelle externally of said exhaust nozzle for controlling the flow of said cooling air through said nacelle outlet.

4. In an aircraft having an air-cooled engine, and a streamlined nacelle enclosing said engine, means for augmenting the thrust of said engine including an exhaust duct extending substantially the full fore-and-aft length of said nacelle, said duct being open at its forward terminal to receive rammed fresh air entering the mouth of said nacelle at a point forward of said engine, said duct provided adjacent its forward portion aft of said forward open extremity with connections to said engine for the flow of exhaust gases therefrom to said duct, said duct having a gradually diminishing cross-section terminating in an open nozzle at its rear extremity centrally disposed within the outlet at the trailing portion of said nacelle, spring-biased valve means disposed within the forwardly opening extremity of said duct for automatically closing said forward extremity of said duct at materially reduced and zero forward speeds and a controllable valve means extending across the rear portion of said nacelle around said exhaust duct for controlling the cooling air flow across said engine and through said nacelle outlet.

5. In a propeller-driven aircraft having a wing, and a power plant including an air-cooled engine supported forwardly of the wing and a streamlined nacelle suspended from said wing and including said engine; said nacelle being elongated longitudinally such that its length is greater than three times its maximum transverse dimension, means for augmenting the thrust of said power plant comprising an exhaust duct extending longitudinally substantially the entire length of said nacelle, said duct having an open forward extremity disposed within the inlet portion of said nacelle and extending longitudinally rearwardly with gradually diminishing cross-section in the rearward direction terminating in an open nozzle at its rearward extremity substantially centrally disposed within the air exit opening at the trailing edge of said nacelle, valve means disposed at the forward extremity of said exhaust duct automatically closable below predetermined forward velocities at which the rammed air effect is overcome and the forward extremity of said exhaust duct is closed to said cooling air inlet, conduit means for the carrying of the exhaust gases from said engine downwardly into the forward portion of said exhaust duct aft of said automatic valve means, a transverse bulkhead disposed within the aft portion of said nacelle about the trailing portion of said exhaust duct, said transverse bulkhead having an opening therein for the passage of engine cooling air therethrough, and controllable valve means for said opening in said transverse bulkhead.

6. In aircraft, a power plant installation, including an air cooled engine, a nacelle enclosing said engine, said nacelle having a forward cooling air inlet and a rearward cooling air outlet, an engine exhaust duct substantially co-extensive with the length of said nacelle, said duct having an inlet forward of said engine within said nacelle forward air inlet and an outlet at said nacelle rearward air outlet, conduit means for conducting exhaust gases from said engine to said duct, automatic means disposed within said duct in the region of the forward end thereof arranged to close said duct inlet in accordance with the cooling air flow into said nacelle air inlet, valve means disposed within the cooling air flow within the rearward portion of said nacelle exteriorly of the exhaust duct, the said nacelle and exhaust duct being substantially co-extensive in length such that they have common air inlets and common air outlets arranged to admit cooling air to said nacelle for cooling said engine and to said exhaust duct for admixture with said exhaust, and to have the engine cooling air accelerated at said common outlet by said admixed engine exhaust to augment the thrust of said power plant installation.

7. An exhaust thrust augmenter for an aircraft power plant comprising an air cooled engine; a nacelle enclosing said engine having a cooling air inlet opening at its forward portion and an air outlet opening at its trailing portion, said nacelle arranged to direct cooling air flow from said inlet to said engine, thence rearwardly through said nacelle and outwardly through said outlet opening; an exhaust duct in communication with the exhaust gas ports of said engine having a gradually diminishing cross-section rearwardly terminating in a nozzle common with the said air outlet of said nacelle, said exhaust duct having an inlet opening common with the cooling air inlet opening of said nacelle arranged such that cooling air is admixed within said duct with said exhaust gases from said engine; and valve means disposed in the said duct inlet opening arranged to close the said inlet of said exhaust duct at predetermined lower speeds of the aircraft.

8. An exhaust thrust augmenter for an aircraft power plant comprising an air cooled engine; a nacelle enclosing said engine having a cooling air inlet opening at its forward portion and an air outlet opening at its trailing portion, said nacelle arranged to direct cooling air flow from said inlet to said engine, thence rearwardly through said nacelle and outwardly through said outlet opening; a duct in communication with the exhaust gases from said engine having a gradually diminishing cross-section rearwardly terminating in a nozzle common with the said air outlet of said nacelle, said exhaust duct having an inlet opening common to the cooling air inlet opening of said nacelle arranged such that cooling air is admixed with said exhaust gases from said engine to improve the combustion thereof; and valve means disposed wihin said nacelle externally of said exhaust duct for regulating the volume of engine cooling air passing rearwardly through said nacelle.

9. An aircraft power plant installation comprising an air cooled engine, an elongated nacelle enclosing said engine, said nacelle having an air inlet at its forward portion for the entrance of cooling air to the interior of said nacelle, said nacelle having an outlet at its trailing portion, an elongated augmenter tube having its forward portion in communication with the exhaust gases from said engine, said elongated augmenter tube extending continuously from the region of said engine in the forward portion of said nacelle rearwardly to and through said outlet at said nacelle trailing portion, and a forwardly directed opening associated with the forward portion of said augmenter tube arranged for the entrance of cooling air from said nacelle inlet into said elongated augmenter tube for admixture with said engine exhaust gases therewithin and the discharge thereof from said elongated augmenter tube into the airstream through said nacelle outlet.

10. An aircraft power plant installation comprising an air cooled engine, an elongated nacelle enclosing said engine, said nacelle having an air inlet at its forward portion for the entrance of cooling air to the interior of said nacelle, said nacelle having an outlet at its trailing portion, an elongated augmenter tube having its forward portion in communication with the exhaust gases of said engine, said elongated augmenter tube extending continuously rearwardly to and through said outlet at said nacelle trailing portion, a forwardly directed opening associated with the forward portion of said augmenter tube arranged for the entrance of cooling air into said elongated augmenter tube from said nacelle air inlet, and valve means disposed within the forward portion of said augmenter tube arranged for controlling the admixture of said cooling air and said exhaust gases within said augmenter tube.

11. An aircraft power plant installation comprising an air cooled engine, an elongated nacelle enclosing said engine, said nacelle having an air inlet at its forward portion for the entrance of cooling air to the interior of said nacelle, said nacelle having an outlet at its trailing portion, an elongated augmenter tube having its forward portion in communication with the exhaust gases of said engine, said elongated augmenter tube extending continuously rearwardly to and through said outlet at said nacelle trailing portion, a forwardly directed opening associated with the forward portion of said augmenter tube arranged for the entrance of cooling air into said augmenter tube for admixture with said engine exhaust gases therewithin and the discharge thereof from said augmenter tube into the airstream through said nacelle outlet, first valve means disposed within the trailing portion of said nacelle for controlling the relative flow of cooling air passing over said engine for the cooling thereof and second valve means disposed within the forward portion of said augmenter tube for controlling the flow of cooling air into said augmenter tube.

12. An aircraft power plant installation comprising an air cooled engine, an elongated nacelle enclosing said engine, said nacelle having an air inlet at its forward portion for the entrance of cooling air to the interior of said nacelle, said nacelle having an outlet at its trailing portion, an elongated augmenter tube having its forward portion in communication with the exhaust gases of said engine, said augmenter tube extending rearwardly through said outlet at said nacelle trailing portion, a forwardly directed opening associated with the forward portion of said augmenter tube arranged for the entrance of cooling air into said elongated augmenter tube for admixture with said engine exhaust gases therewithin and the discharge thereof from said augmenter tube into the airstream through said nacelle outlet, valve means operatively associated with said forwardly directed opening of said augmenter tube arranged for controlling the admixture of said cooling air and said exhaust gases within said augmenter tube, and further valve means operatively mounted within said nacelle exteriorly of said augmenter tube for controlling the relative flow of cooling air passing over said engine for the cooling thereof.

13. The combination with an aircraft power plant installation having an air cooled engine and a nacelle enclosing said engine, said nacelle having cooling air inlet and outlet openings at its leading and trailing extremities, of an engine exhaust duct co-extensive with the length of said nacelle having an inlet forward of said engine adjacent said nacelle air inlet and an outlet adjacent said air outlet, means for conducting exhaust gases from said engine to said exhaust duct, valve means disposed within said nacelle arranged for the control of the cooling air flow, said valve means being disposed exteriorly of the said exhaust duct, the common air inlets and outlets in both said nacelle and said exhaust duct arranged to admit cooling air to said nacelle for cooling said engine and to said exhaust duct for admixture with said exhaust gases and arranged such that the engine cooling air is accelerated at said common outlet by said admixed engine exhaust gases to augment the thrust of said power plant installation.

RICHARD S. BOUTELLE.

REFERENCES CITED

The following references are of record in the file of this patent:

UNITED STATES PATENTS

| Number | Name | Date |
|---|---|---|
| 1,279,128 | Lake | Sept. 17, 1918 |
| 1,370,197 | Bolotoff | Mar. 1, 1921 |
| 2,048,399 | Leaning | July 21, 1936 |
| 2,177,642 | Fellers | Oct. 31, 1939 |
| 2,390,161 | Mercier | Dec. 4, 1945 |
| 2,401,941 | Lee | June 11, 1946 |

OTHER REFERENCES

Ser. No. 326,141, Ramshorn (A. P. C.), published May 11, 1943.